(12) United States Patent
Nakahira

(10) Patent No.: US 7,493,041 B2
(45) Date of Patent: Feb. 17, 2009

(54) OPTICAL PATH RE-ARRANGEMENT METHOD FOR OPTICAL COMMUNICATION NETWORK

(75) Inventor: Yoshihiro Nakahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 372 days.

(21) Appl. No.: 11/296,697

(22) Filed: Dec. 8, 2005

(65) Prior Publication Data

US 2006/0159453 A1 Jul. 20, 2006

(30) Foreign Application Priority Data

Dec. 10, 2004 (JP) ............................. 2004-358076

(51) Int. Cl.
*H04J 14/00* (2006.01)
(52) U.S. Cl. ............................. 398/49; 398/45; 398/51; 398/59; 398/19
(58) Field of Classification Search .................. 398/49, 398/45, 51, 19, 59
See application file for complete search history.

(56) References Cited

U.S. PATENT DOCUMENTS

| | | | | |
|---|---|---|---|---|
| 5,566,338 | A * | 10/1996 | Kodama et al. | 710/260 |
| 6,317,439 | B1 * | 11/2001 | Cardona et al. | 370/503 |
| 6,559,984 | B1 * | 5/2003 | Lee et al. | 398/5 |
| 7,313,328 | B2 * | 12/2007 | Oki et al. | 398/51 |
| 2003/0043745 | A1 * | 3/2003 | Kano et al. | 370/238 |
| 2004/0136385 | A1 * | 7/2004 | Xue et al. | 370/401 |

OTHER PUBLICATIONS

"Dynamic path switching experiment for maximizing throughout on IP optical GMPLS test-bed net work", Yoshihiro Nakahira et al., 2004 Optical Society of America, Feb. 2004.
"A study of Sequence for the IP traffic drive Optical Path Rearrangement System", Yoshihiro Nakahira et al., SB2-5, IEICE, Mar. 2004.
Japanese Official Office Action dated Jan. 9, 2007 with English Translation, which was issued by the Japanese Patent Office in connection with Japanese counterpart application No. 2004-258076.

* cited by examiner

*Primary Examiner*—Kenneth N Vanderpuye
*Assistant Examiner*—Hibret A Woldekidan
(74) *Attorney, Agent, or Firm*—Venable LLP; James R. Burdett

(57) ABSTRACT

When an optical path arrangement is re-arranged, the packet loss amount is reduced by judging whether to perform the shift in one stage or whether to perform the shift in two stages in accordance with the state of the network. This is implemented by an optical communication network comprising a plurality of routers, a plurality of optical switches, optical fiber connecting the routers and optical switches or connecting the optical switches, and a management device. First, the first evaluation value is determined by evaluating the packet loss amount resulting from a one-stage shift. Thereafter, when the optical path arrangement is changed by means of a two-stage shift, the optical path group to be changed is divided into two, one optical path group is selected as the first-order shift optical path, and the other optical path group is made the second shift optical path. Thereafter, a second evaluation value is established by evaluating the packet loss amount when shifting the optical path arrangement by means of a two-stage shift. When the second evaluation value is smaller than the first evaluation value, the first evaluation value is substituted by the second evaluation value. The above steps are repeated until the processing termination condition is satisfied.

8 Claims, 12 Drawing Sheets

OPTICAL PATH RE-ARRANGEMENT METHOD FOR OPTICAL COMMUNICATION NETWORK

BACKGROUND OF THE INVENTION

1. Field of the Invention

The present invention relates to an optical path re-arrangement method for an optical communication network.

2. Description of Related Art

An optical communication network comprises a plurality of routers, a plurality of optical switches, optical fibers connecting the routers and optical switches or connecting two optical switches, and a management device. In the optical communication network, shifting the arrangement of optical paths of the whole optical communication network (known simply as 'optical path arrangement'hereinbelow) dynamically in order to increase the packet transfer capacity, that is, re-arranging the optical path arrangement has been proposed (See Nonpatent Document 1: Nakahira et al., "Dynamic path switching experiment for maximizing throughput on IP optical GMPLS test-bed network", OFC2004, Los Angeles, February, 2004, and Nonpatent Document 2: Nakahira et al. "Study of shifting procedure for dynamic optical path arrangement corresponding with traffic" SB2-5, EICEE, March 2004, for example).

The shift (re-allocation) from the currently used optical path arrangement (known hereinafter simply as 'current path arrangement' to an optimum optical path arrangement (known hereinafter simply as 'optimum path arrangement' is performed by switching the optical switches provided in the optical communication network and by changing the individual optical paths by switching the router settings, for example.

About the methods of shifting (re-allocating) from the current path arrangement to the optimum path arrangement for the whole optical communication network, there is a method that arranges new optical paths by canceling all the optical paths that need to be changed and then using the network resources obtained as a result of the cancellation, for example. Alternatively, there is also a method that makes the shift from the current path arrangement to the optimum path arrangement by arranging new optical paths by canceling half the number of optical paths that need to be changed all together and using the network resources obtained as a result of the cancellation and then arranging new optical paths after canceling the remaining half number of optical paths all together (See Nonpatent Document 2).

However, in the case of the optical path re-arrangement method of the optical communication network of the above prior art example, at the time of the shift of the optical path arrangement, the network resources that can be used decrease temporarily. That is, when the optical paths that need to be changed are canceled, the packets transmitted by the optical paths are transferred to other optical paths and, therefore, congestion and so forth occurs in the other optical paths, routers, and so forth, and there is the risk of a loss of packets occurring.

In the shift of the optical path arrangement, two types of methods, namely methods performed in one stage and methods performed in two stages are executed. Here, performing the shift of the optical path arrangement in one stage involves setting new optical paths after canceling all the optical paths that need to be changed all together. Further, performing the shift of the optical path arrangement in two stages involves dividing the optical paths that need to be changed into two groups, setting new optical paths after initially canceling the optical paths of the one group altogether, and setting new optical paths after canceling the optical paths of the other group altogether.

It is dependent on the constitution of the optical communication network and the state of the network such as traffic in which cases of performing the shift of the optical path arrangement in one stage and performing same in two stages the amount of packet loss decreases. When the shift is made in one stage, although the time required for the shift is short, the optical paths that can be used in the shift decrease. On the other hand, when the shift is made in two stages, there are more optical paths that can be used in the shift than when the shift is made in one stage and, therefore, packet loss is not readily produced. However, because the time required for the shift is longer than in the case where the shift is made in one stage, there is sometimes a larger amount of packet loss as a result.

In the optical path re-arrangement method of a conventional optical communication network, there is no procedure for judging whether the shift of the path arrangement is made in one stage or whether the shift is performed in two stages in accordance with the state of the network. As a result, it has not been possible to make the shift of the optical path arrangement by means of the optimum method with which there is a small amount of packet loss.

The present invention was conceived in view of the above problem and an object of the present invention is to provide an optical path re-arrangement method of an optical communication network that makes it possible to reduce the amount of packet loss during the shift of the path arrangement by judging whether the shift of the path arrangement is made in one stage or two stages in accordance with the state of the optical communication network.

SUMMARY OF THE INVENTION

In order to achieve the above object, the optical path re-arrangement method of the optical communication network of the present invention is implemented in the optical communication network comprising a plurality of routers, a plurality of optical switches, optical fiber connecting the routers and optical switches or for connecting the optical switches, and a management device, and comprises the following step.

First, in a one-stage packet loss evaluation step, the amount of packet loss when changing the optical path arrangement by means of a one-stage shift is evaluated and obtained as a first evaluation value. Thereafter, a two-stage shift evaluation step is performed after the first evaluation value has been recorded in a storage device in the first evaluation value recording step. The two-stage shift evaluation step includes a first-order shift optical path selection step and a two-stage packet loss evaluation step. In the first-order shift optical path selection step, when the optical path arrangement is changed by means of a two-stage step consisting of a first-order shift and a second-order shift, one optical path group rendered by dividing the group of optical paths to be changed into two is selected as the first-order shift optical paths, while the other optical path group becomes the second-order shift optical paths. Thereafter, in the two-stage packet loss evaluation step, the amount of packet loss when the optical path arrangement is changed as a result of the two-stage shift is evaluated and obtained as a second evaluation value. Thereafter, in a comparison step, the second evaluation value is compared with the first evaluation value and, when the second evaluation value is smaller than the first evaluation value, the first evaluation value is substituted with the second evaluation value, whereupon the first evaluation value following the substitution and the first-and second-order shift optical paths are recorded in the storage device.

A processing termination condition that is pre-recorded in the storage device is read and a two-stage shift evaluation step and comparison step are repeated until the processing termination conditions are satisfied.

According to the optical path re-arrangement method of the optical communication network of the present invention, in cases where the optical path arrangement is changed by means of a one-stage shift and cases where the optical path arrangement is changed by means of a two-stage shift, the smallest amount of packet loss, that is, an optimum resolution, can be discovered within the range of the processing termination condition that is pre-recorded in the storage device.

When the optical path re-arrangement method of the above optical communication network is implemented, in the first-order shift optical path selection step, a plural sets of first-order shift optical paths and second-order shift optical paths is preferably selected at the same time and, in the two-stage packet loss evaluation step, the packet loss amounts relating to the selected plural sets of a first-order shift optical paths and second-order shift optical paths are obtained at the same time and the smallest packet loss amount among the plurality of packet loss amounts thus obtained is preferably made the second evaluation value.

A plurality of two-stage shift evaluation steps are performed at the same time and the best of the results is made the second evaluation value, whereby an optimum resolution can be found in a short time.

When the optical path re-arrangement method of the optical communication network above is implemented, in the first-order optical path selection step, the neighborhood solution for the first-order shift optical paths rendered by obtaining the second evaluation value and the locally optimal escape resolution are preferably selected for the first-order shift optical paths.

When the two-stage shift evaluation step is performed, the optimum-resolution search time can be shortened by using the neighborhood solution for the first-order shift optical paths rendered by obtaining the second evaluation value. Further, for the neighborhood solution, the optimum resolution search can be performed without locally optimal trapping by performing the two-stage shift evaluation step by using a locally optimal escape resolution different from the neighborhood solution for the first-order shift optical path.

Furthermore, the optical path re-arrangement method of the optical communication network of the present invention is implemented in an optical communication network that comprises a plurality of routers, a plurality of optical switches, optical fiber connecting the routers and optical switches or for connecting the optical switches, and a management device and comprises the following steps.

First, in the one-stage packet loss evaluation step, the amount of packet loss when changing the optical path arrangement by means of a one-stage shift is evaluated and obtained as the first evaluation value. Thereafter, an N (where N is an integer of two or more)-stage shift evaluation step is performed after the first evaluation value is recorded in the storage device in the first evaluation value recording step. The N-stage shift evaluation step comprises first- to (N-1-order shift optical path selection steps and an N-stage packet loss evaluation step.

In the first- to (N-1)th-order shift optical path selection steps, when the optical path arrangement is changed by means of the N-stage shift of the first- to Nth-order shifts (where N is an integer of two or more), the group of changed optical paths is divided into N equal parts and the first- to (N-1)th-order shift optical paths are selected respectively, while the remaining optical paths become the Nth-order shift optical paths. In the N-stage packet loss evaluation step, the amount of packet loss when the optical path arrangement is changed by means of an N-stage shift is obtained.

In a multiple-stage shift evaluation step, as a result of performing second- to N-stage shift evaluation steps respectively, the smallest amount of packet loss among the plurality of packet loss amounts thus obtained is obtained as the second evaluation value.

In addition, the second evaluation value is compared with the first evaluation value and, when the second evaluation value is smaller than the first evaluation value, the first evaluation value is substituted with the second evaluation value, whereupon the substituted first evaluation value and the first- to Nth-order shift optical paths are recorded in the storage device.

A processing termination condition that is pre-recorded in the storage device is read and two- to N-stage shift evaluation steps, a multiple-stage shift evaluation step, and a comparison step are repeated until the processing termination conditions are satisfied.

The optical path re-arrangement method of an optical communication network of the present invention permits evaluation of cases with an increased number of change stages because an evaluation is performed within the range of the processing termination condition, from cases where the optical path arrangement is changed by means of a one-stage shift to cases where the optical path arrangement is changed by means of an N-stage shift. An optimum resolution with a smaller amount of packet loss than a one-stage or two-stage case can be found.

BRIEF DESCRIPTION OF THE DRAWINGS

The foregoing and other objects, features and advantageous of the present invention will be better understood from the following description taken in connection with the accompanying drawings, in which;

FIG. 2(A) shows the optical path arrangement prior to the shift and FIG. 2(B) shows the optical path arrangement following the shift;

DESCRIPTION OF THE PREFERRED EMBODIMENTS

Although embodiments of the present invention are illustrated hereinbelow with reference to the drawings, the constitution and dispositional relationships are only shown schematically to the extent of allowing an understanding of the present invention. Further, although preferred constitutional examples of the present invention are illustrated hereinbelow, these are only preferred examples and, therefore, the present invention is not limited to the following embodiments.

Constitution of the Optical Communication Network

Figure 1:
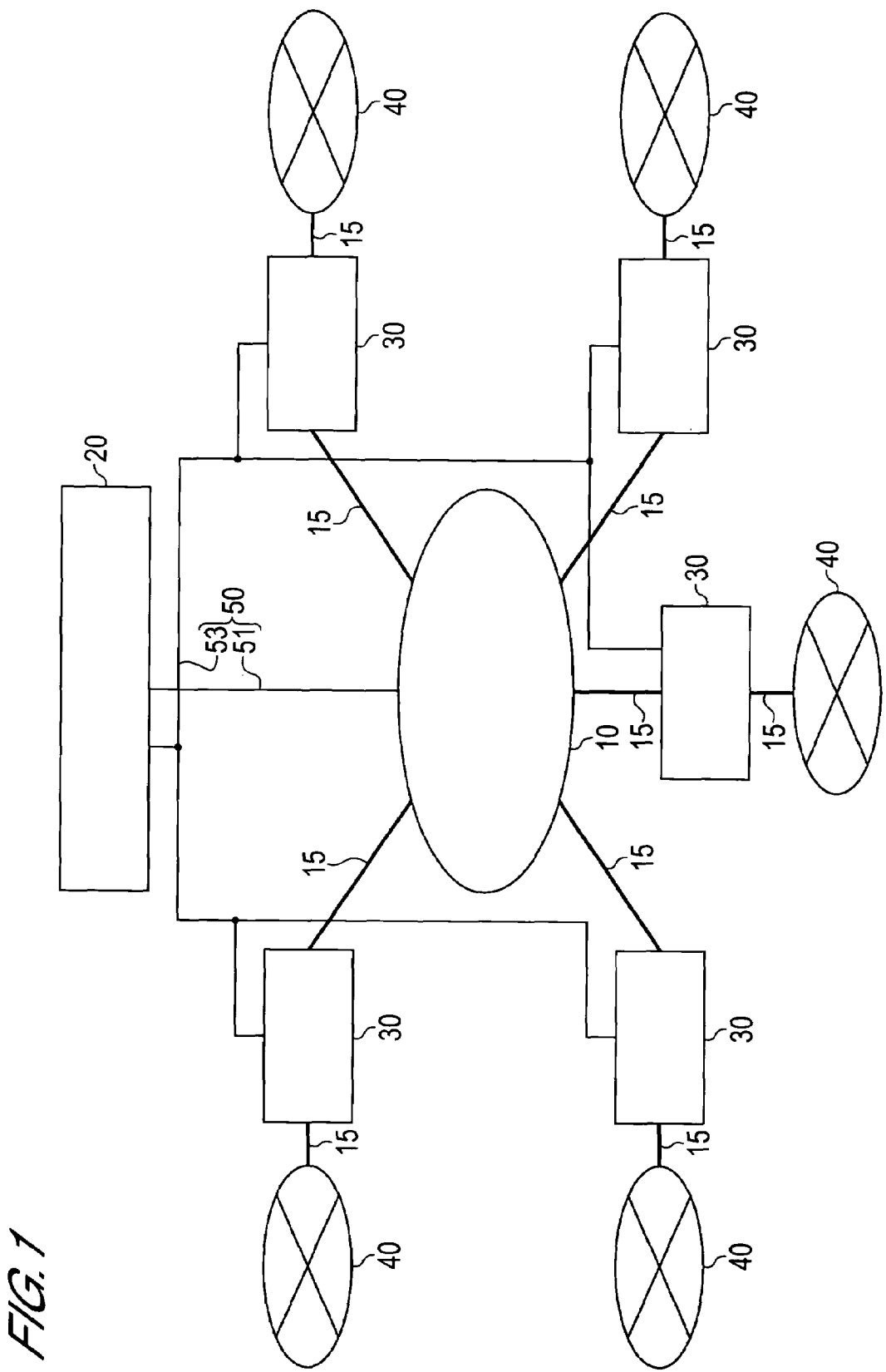
FIG. 1 is a schematic constitutional view of an optical communication network.

An outline of an optical communication network that implements the re-arrangement of the optical path arrangement will be described with reference to FIG. 1. FIG. 1 is a schematic view serving to illustrate the constitution of the optical communication network.

The optical communication network is constituted comprising an optical transmission network 10, a management device 20, and a plurality of routers 30. The plurality of routers 30 relay packets that are transmitted as optical signals between an external network 40 and the optical transmission network 10. The optical transmission network 10 is constituted further comprising a plurality of optical switches and optical fiber that links the optical switches. Further, FIG. 1 does not illustrate the optical switches and optical fiber that the optical transmission network 10 comprises.

The routers 30 are physically connected to the optical switches that the optical transmission network 10 comprises by means of optical fiber 15. Further, optical paths that transmit packets are established between the plurality of routers 30 connected to the optical transmission network 10 by means of the optical switches that the optical transmission network 10 comprises. Further, the routers 30 are constituted comprising a function for measuring the amount of relayed traffic and an optical path setting function for setting the packet transmission destination in response to receiving an optical path setting signal from the management device 20, and optionally preferred commonly known routers can be used. The routers 30 are connected to the management device 20 via a router control line 53. The amount of traffic measured by the routers 30 is sent from the routers 30' to the management device 20 via the router control line 53. Further, a route setting signal of the routers 30 is sent from the management device 20 to the routers 30 via the router control line 53.

The optical switches that the optical transmission network 10 comprises are connected to the management device 20 via an optical switch control line 51. The switching of the optical switches is performed in response to the optical switch switching signal sent from the management device 20 via the optical switch control line 51 and the optical path is changed as a result of the switching of the optical switches.

Figure 2A:
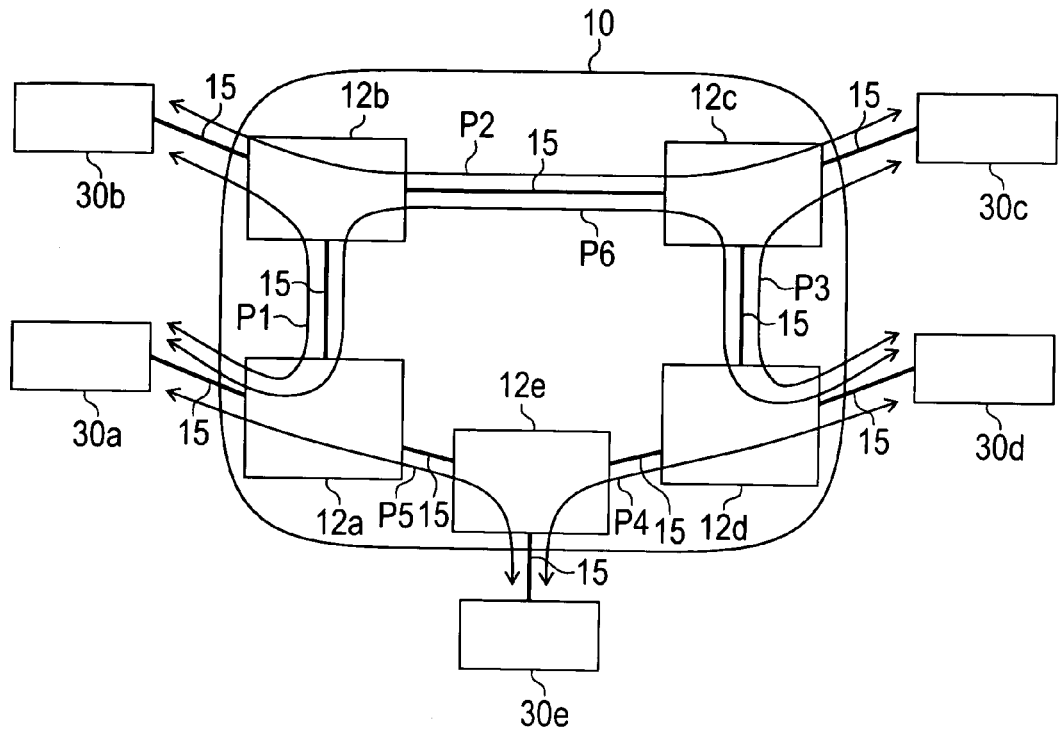
FIGS. 2(A) and 2(B) are schematic views serving to illustrate changes to the optical path arrangement, where
Figure 2B:
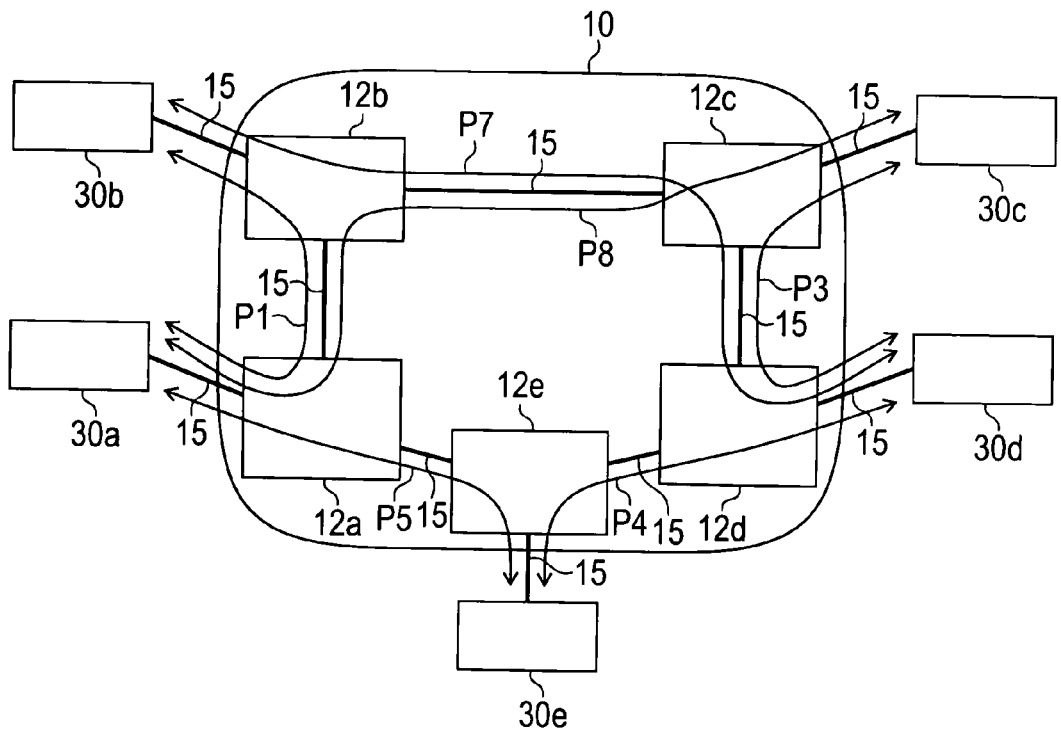

The changing of an optical path for performing the shift of the optical path arrangement of the optical transmission network 10 will now be described with reference to FIGS. 2(A) and 2(B). FIGS. 2(A) and 2(B) are schematic diagrams serving to illustrate changes in the optical path through switching of the optical switches, where FIG. 2A shows the optical path arrangement prior to the shift and FIG. 2B shows the optical path arrangement after the shift.

Further, in this example, the optical transmission network 10 is constituted comprising first to fifth optical switches 12a to 12e (sometimes also represented by the code 12 hereinbelow) to produce a constitution in which first to fifth routers 30a to 30e (sometimes also represented by the code 30 hereinbelow) are correspondingly connected one by one to the first to fifth optical switches 12a to 12e respectively. The optical switches 12, and the routers 30 and optical switches 12 are connected to one another by optical fiber 15. Further, the constitution and so forth of the optical transmission network 10 is not limited to this example. The number of optical switches 12 that the optical transmission network 10 comprises can be a preferred number corresponding with the settings. Furthermore, two or more routers 30 may be connected to the optical switches 12 or there may be an optical switch 12 to which a router 30 is not connected. The optical path arrangement is set by means of the settings of the packet transmission destination of the respective routers 30 and by the switching of the optical switches 12.

In the pre-shift optical path arrangement, an optical path P1 is disposed between a first router 30a and a second router 30b, an optical path P2 is disposed between the second router 30b and a third router 30c, an optical path P3 is disposed between the third router 30c and a fourth router 30d, an optical path P4 is disposed between the fourth router 30d and a fifth router 30e, and an optical path P5 is disposed between the fifth router 30e and the first router 30a. In addition, an optical path P6 is disposed between the first router 30a and fourth router 30d via the first optical switch 12a, the second optical switch 12b, the third optical switch 12c, and the fourth optical switch 12d sequentially (FIG. 2(A)).

When the third optical switch 12c, for example, is switched when in such an optical path arrangement (FIG. 2(A)), the optical path P2 and optical path P6 are canceled, an optical path P7 is newly disposed between the second router 30b and the fourth router 30d and an optical path P8 is newly disposed between the first router 30a and the third router 30c (FIG. 2(B)).

First Embodiment

Figure 3:
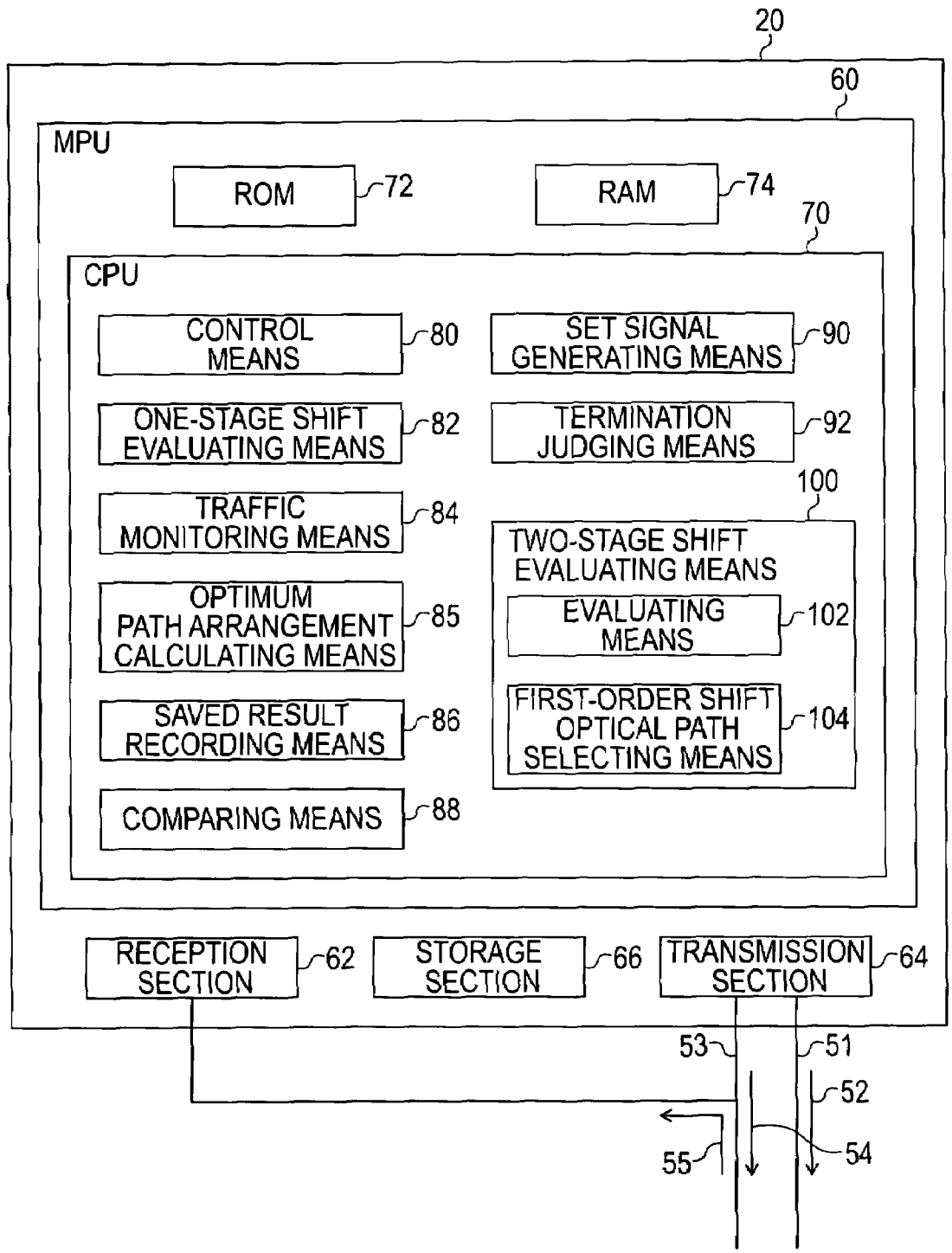
FIG. 3 is a block diagram that serves to illustrate the management device of a first embodiment.
Figure 4:
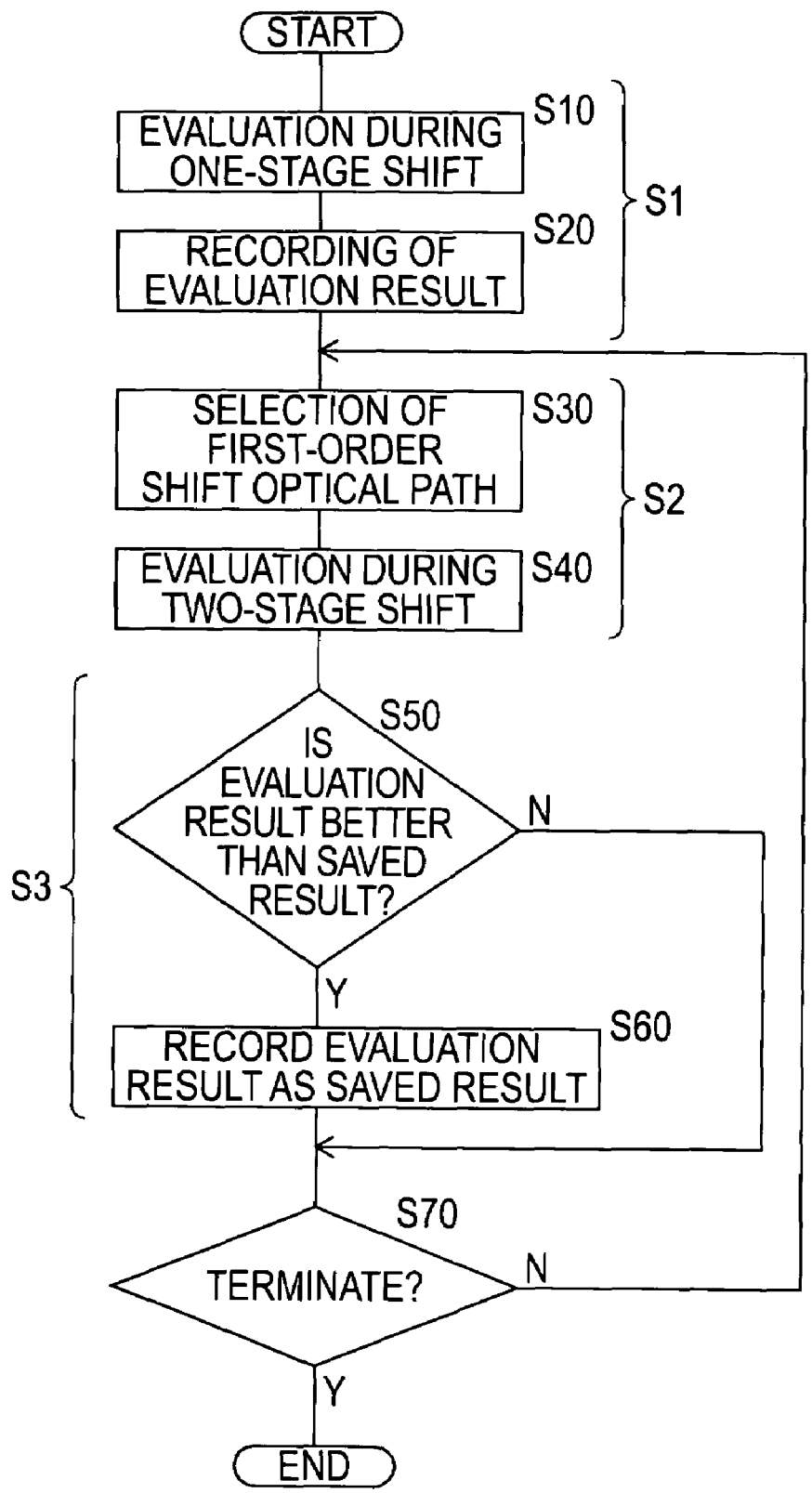
FIG. 4 shows the step flow of the management device of the first embodiment.

The method of the optical path re-arrangement of the first embodiment will now be described with reference to FIGS. 3 and 4. FIG. 3 is a block diagram serving to illustrate the constitution of the management device 20 and FIG. 4 shows the step flow of the management device 20. Further, in the following description, a description will be provided with reference to FIGS. 1 and 2 as required.

The management device 20 is able to use a commonly known computer or the like that is constituted comprising an MPU (Microprocessing Unit) 60, a storage section 66, a reception section 62, and a transmission section 64. An optionally preferred commonly known storage device such as a hard disk or the like is used as the storage section 66. The MPU 60 can have a commonly known constitution and is constituted here comprising a central processing unit (CPU) 70, as well as a RAM (Random Access Memory) 74 and a ROM (Read Only Memory) 72 as memory.

By reading and executing the program recorded so that same can be read in the ROM 72 or the like, control means 80, which the CPU 70 comprises, implement one-stage shift evaluating means 82, traffic monitoring means 84, optimum path arrangement calculating means 85, saved result recording means 86, comparing means 88, set signal generating means 90, termination judging means 92, and two-stage shift evaluating means 100 as function means of the CPU 70. The two-stage shift evaluating means 100 further comprise evaluating means 102 and first-order shift optical path selecting means 104. Further, the functions that the respective function means comprise will be described subsequently.

The traffic monitoring means 84 of the management device 20 usually monitor traffic information and receive traffic information of each of the routers in the current path arrangement via the router control line 53 and reception section 62. The traffic information is readably written from and to the storage device of the storage section 66 or RAM 74 or the like. Further, the set state of the current path arrangement is saved in the storage device of the storage section 66 or RAM 74 or the like.

The optimum path arrangement calculating means 85 read traffic information from the storage section 66 or RAM 74, calculates the optimum path arrangement on the basis of the traffic information, obtains the optimum path arrangement, and stores the optical path arrangement in a storage device of the storage section 66 or RAM 74 or the like. Further, the calculation to obtain the optimum path arrangement can employ an optionally preferred commonly known optimization algorithm and can employ a genetic algorithm, for example. The shift from the current path arrangement to the optimum path arrangement that is obtained by the optimum path arrangement calculating means 85 is performed by means of the following procedure.

The calculation of the optimum path arrangement is performed in response to the writing of traffic information in cases such as one where traffic of a route that is different from the currently set optical path has increased. Further, traffic information may be saved as information that changes with time of a long period of one day or more, for example and may be traffic information that is based on this time-dependent information.

In step (step is indicated by 'S' hereinbelow) 1, the one-stage shift evaluating means 82 performs a one-stage shift evaluation step that evaluates the amount of packet loss when the optical path arrangement is changed by means of a one-stage shift. The one-stage shift evaluation step S1 comprises a one-stage packet loss evaluation step that evaluates first-order shift optical paths of S10 and an evaluation result recording step that records the evaluation result of S20. The evaluation result is made the first evaluation result value.

Figure 5A:
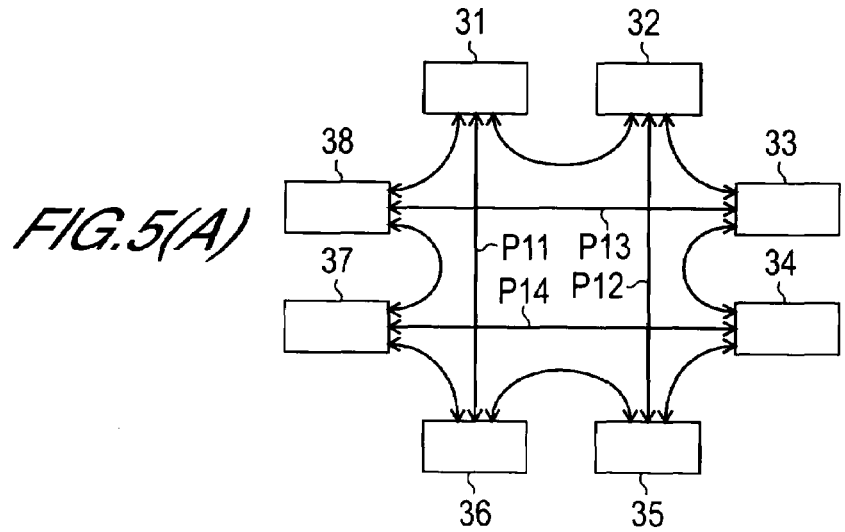
FIGS. 5(A), 5(B), and 5(C) serve to illustrate a one-stage shift.
Figure 5B:
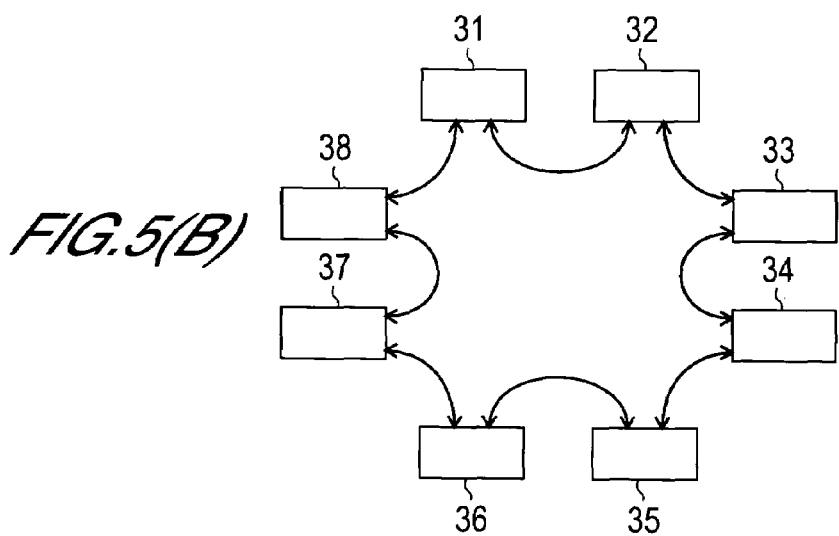
Figure 5C:
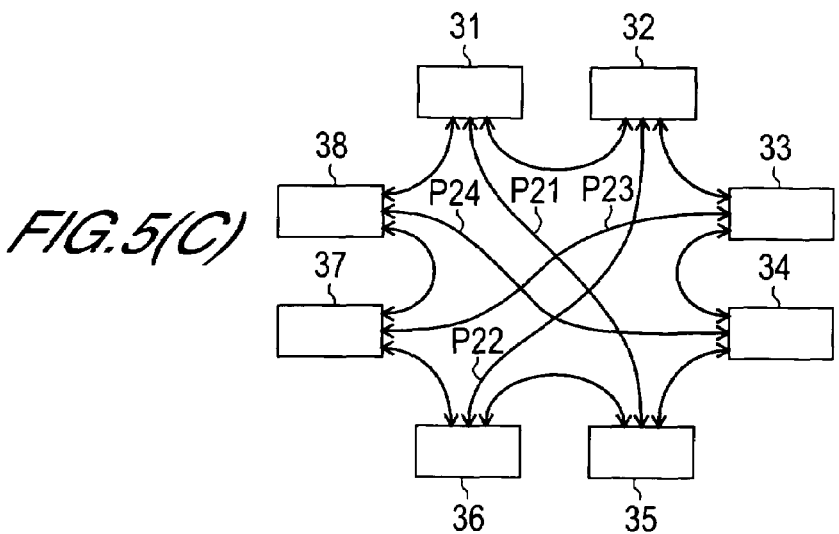

Optical path re-arrangement by means of a one-stage shift will be described with reference to FIGS. 5(A), 5(B), and 5(C). FIGS. 5(A), 5(B), and 5(C) are schematic views serving to illustrate the optical path arrangement at the time of the one-stage shift. Here, the optical communication network that performs the optical path re-arrangement is described by way of an example in which the optical communication network comprises eight routers 31 to 38 but the number of routers provided is not restricted to eight. Further, in the following description, optical paths are sometimes simply indicated by code 'P'.

In order to obtain the first evaluation value, the one-stage shift evaluating means 82 first select an optical path group that is canceled and set by means of the shift of the path arrangement by comparing the current path arrangement (FIG. 5(A)) read from the storage device of the storage section 66 or RAM 74 or the like with the optimum path arrangement (FIG. 5(C)). Here, this is an optical path group in which P11 linking the first router 31 and the sixth router 36, P12 linking the second router 32 and the fifth router 35, P13 linking the third router 33 and the eighth router 38, and P14 linking the fourth router 34 and the seventh router 37 are canceled. Further, this is an optical path group in which P21 linking the first router 31 and the fifth router 35, P22 linking the second router 32 and sixth router 36, P23 linking the third router 33 and seventh router 37 and P24 linking the fourth router 34 and eighth router 38 are set. The canceled optical path group is known hereinafter simply as the 'canceled paths' and the set optical path group is known hereinbelow simply as the 'set paths'.

Thereafter, the packet loss amount generated by the cancellation (FIG. 5(B)) of the canceled paths is calculated on the basis of the traffic information read from the storage section 66 or RAM 74. Here, the packet loss amount thus found is the evaluation result, that is, the first evaluation value.

In the evaluation result recording step of S20, the saved result recording means 86 record the packet loss amount obtained in the one-stage packet loss evaluation step of S10, that is, the first evaluation result so that same can be read and rewritten in the storage section 66 or RAM 74, as the saved result.

After the first evaluation result has been recorded as the saved result, a two-stage shift evaluation step S2 is performed in response to the recording. The two-stage shift evaluation step S2 includes a first-order shift optical path selection step of S30 and a two-stage packet loss evaluation step of S40.

Figure 6A:
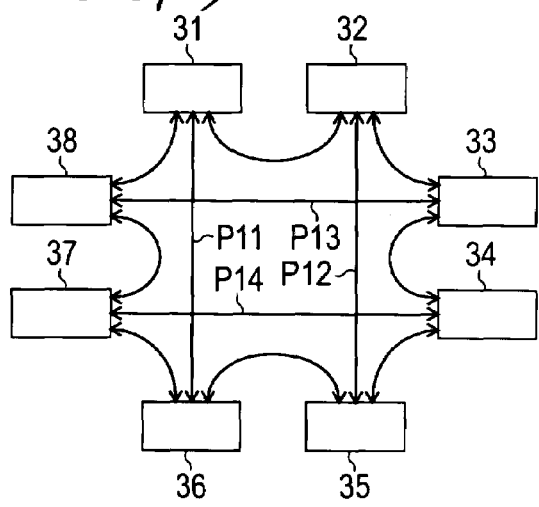
FIGS. 6(A), 6(B), 6(C), 6(D), and 6(E) serve to illustrate a two-stage shift.

An optical path re-arrangement using a two-stage shift will now be described with reference to FIGS. 6(A), 6(B), 6(C), 6(D), and 6(E). FIGS. 6(A), 6(B), 6(C), 6(D), and 6(E) are schematic views serving to illustrate the optical path arrangement at the time of a two-stage shift. FIG. 6(A) shows the current path arrangement as FIG. 5(A).

In the first-order shift optical path selection step of S30, the first-order shift optical path selecting means 104 of the two-stage shift evaluating means 100 divide the canceled paths into two groups, wherein optical paths belonging to one group are selected as first-order shift optical paths and the optical paths belonging to the other group are second-order shift optical paths. Here, the selection of half the number of canceled paths as first-order shift optical paths and the setting of the remaining half as the second-order shift optical paths by the optical path selecting means 104 are described. Further, the selection of the first-order shift optical paths is performed by randomly selecting half the number of optical paths from the canceled paths P11, P12, P13, and P14. In this example, the first-order shift optical paths P11 and P12 are selected and the remaining P13 and P14 are set as the second-order shift optical paths.

In the two-stage packet loss evaluation step of S40, the evaluating means 102 of the two-stage shift evaluating means 100 calculate the packet loss amount when shifting the optical path arrangement by means of a two-stage shift on the basis of the first-order shift optical path and second-order shift optical path selected in S30 and the traffic information that is read from the storage section 66 or RAM 74. The packet loss amount that is required as a result of the calculation, that is, the second evaluation value is readably recorded in the RAM 74 as the evaluation result.

Figure 6B:
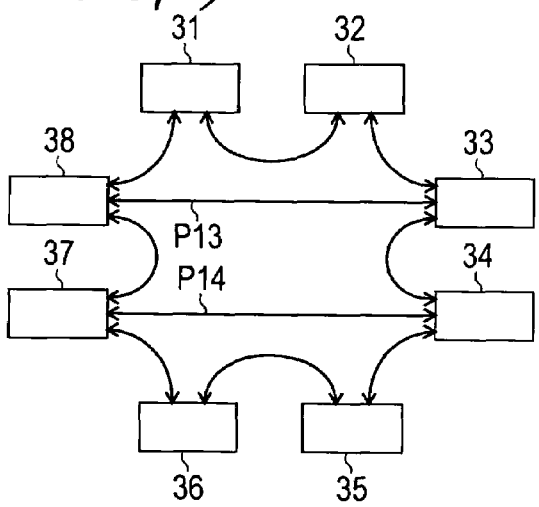
Figure 6C:
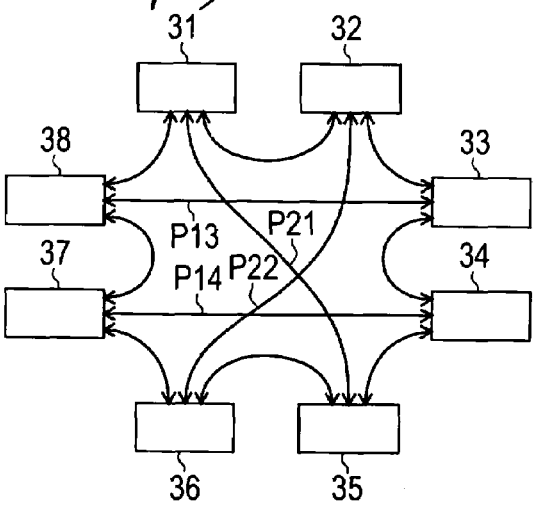
Figure 6D:
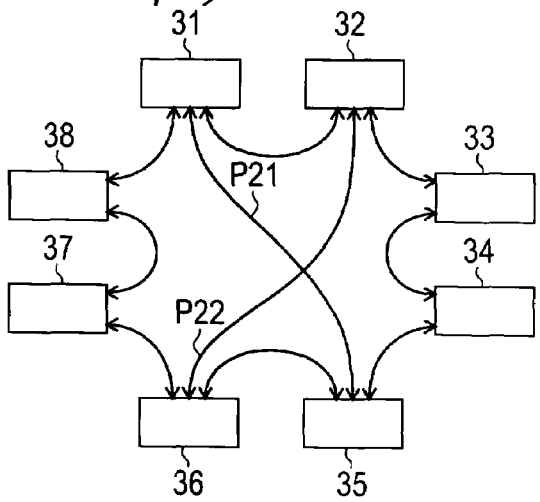
Figure 6E:
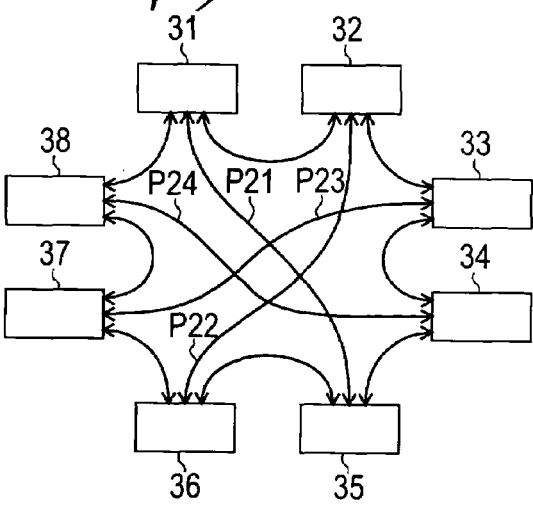

In the two-stage shift, P11 and P12, which are first-order shift optical paths, are canceled (FIG. 6(B)). Thereafter, the set paths P21 and P22 are set by using network resources such as the I/O ports of the routers and optical switches, which can be used through cancellation (FIG. 6(C)). P13 and P14, which are second-order shift paths, are then canceled (FIG. 6(D)). P23 and P24 are set by using network resources that can be used through cancellation of P13 and P14, and the optimum path arrangement is obtained as a result (FIG. 6(E)). The product of the packet amounts that are lost in a state where a portion of the optical paths shown in FIGS. 6(B) and 6(D) are canceled is the packet loss amount.

A comparison step S3 starts in response to the writing of the second evaluation value to the RAM 74. The comparison step S3 includes S50 and S60. In S50, the comparing means 88 perform an evaluation by reading the second evaluation value that is recorded in the RAM 74 and the first evaluation value that is recorded in the RAM 74 or storage section 66 respectively and comparing the second evaluation value and first evaluation value. When, as a result of the comparison, the second evaluation value is smaller than the first evaluation value, the comparing means 88 judge that the evaluation result is superior to the saved result, that is, that the packet loss amount of the evaluation result is smaller than the packet loss amount of the saved result. When it is judged that the second evaluation value is superior, in S60, the second evaluation value is substituted with the previously saved result, that is, the first evaluation value in response to the judgment and then newly recorded in the RAM 74 or storage section 66 as the saved result.

In S70, in response to the termination of the rewriting of the saved result, the termination judging means 92 judge whether the processing termination condition is satisfied. The processing termination condition can be optionally preferably set as the time for performing the processing of the management device 20, or the number of times that the round step of the two-stage shift evaluation step S2 and the comparison step S3 are repeatedly implemented for example, and so forth. In each round of processing, a comparison is made with the processing termination condition read from the storage device and the two-stage shift evaluation step S2 and comparison step S3 are repeated until the processing termination condition is satisfied. The processing termination result is readably recorded in the ROM 72 beforehand.

According to the optical path re-arrangement method of the optical communication network of the first embodiment, in cases where the optical path arrangement is changed by means of a one-stage shift and cases where the optical path arrangement is changed by means of a two-stage shift, an optimum resolution with the smallest amount of packet loss can be discovered within the range of the processing termination condition.

After the optimum resolution has been discovered, a shift from the current path arrangement to the optimum path arrangement, that is, the optical path re-arrangement is performed in a state where the packet loss amount is minimum by switching the routers and optical switches in accordance with the optimum resolution.

Second Embodiment

Figure 7:
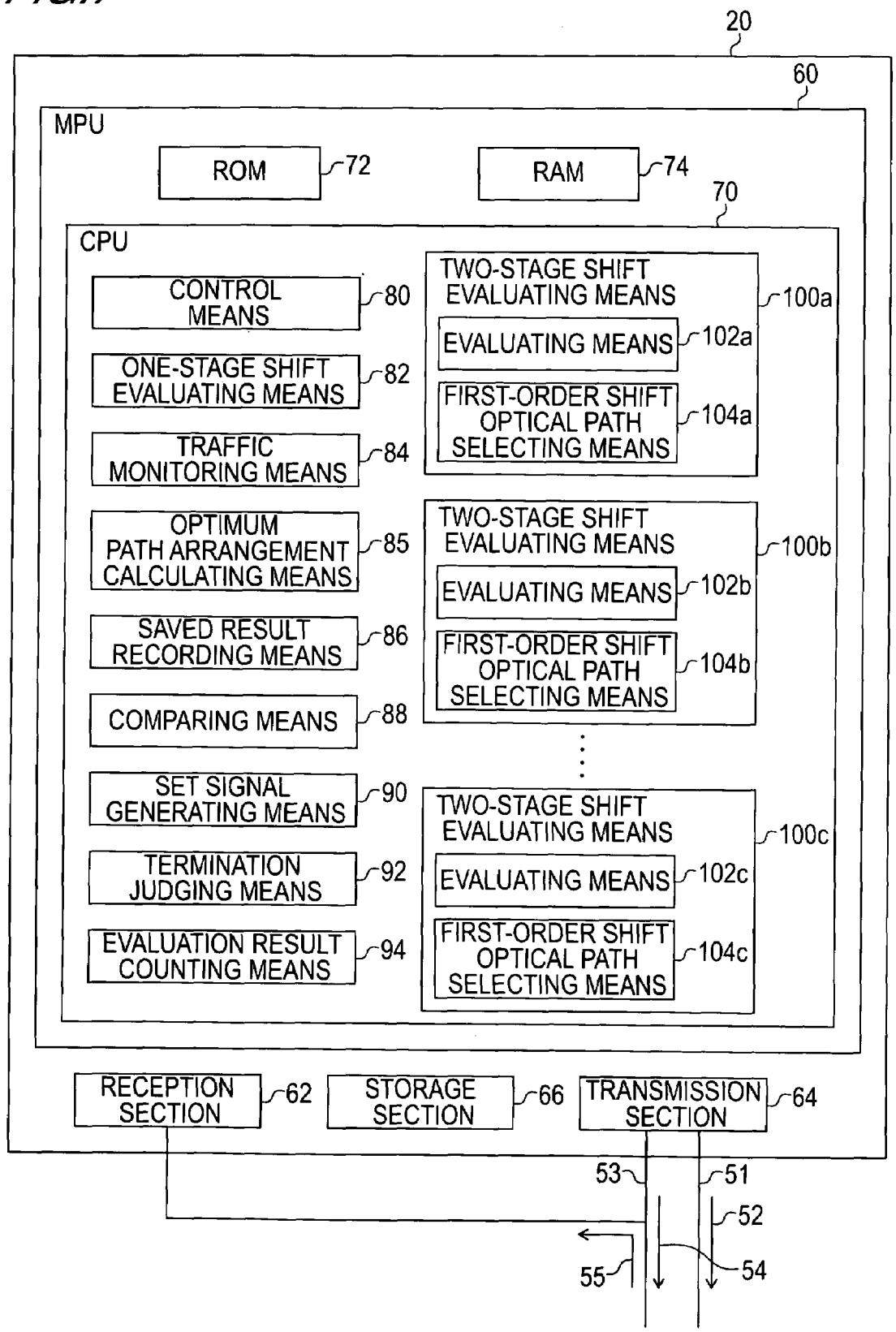
FIG. 7 is a block diagram serving to illustrate the management device of a second embodiment.
Figure 8:
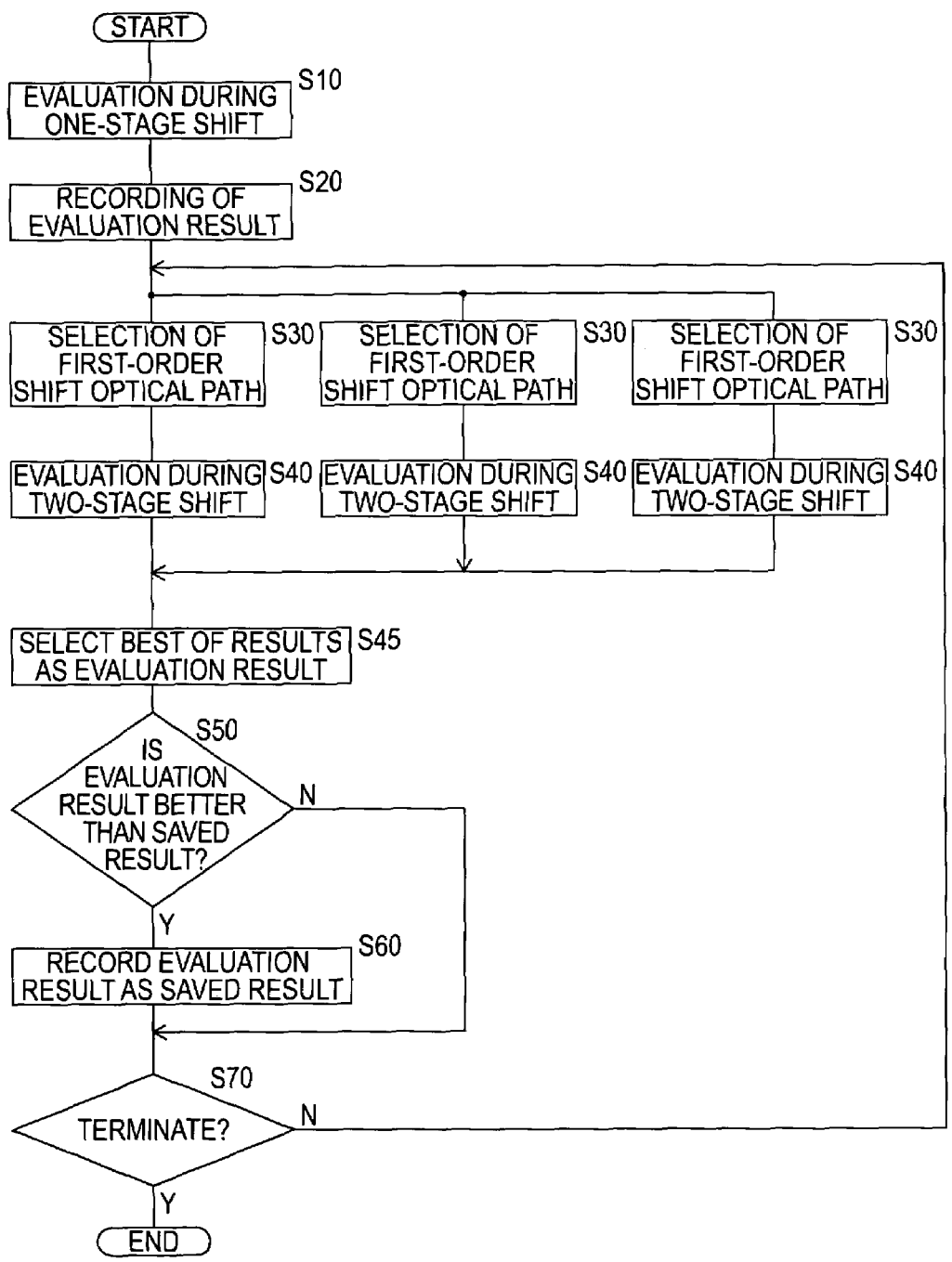
FIG. 8 shows the step flow of the management device of the second embodiment.

The optical path shift method of the second embodiment will now be described with reference to FIGS. 7 and 8. FIG. 7 is a block diagram serving to illustrate the constitution of the management device 20 and FIG. 8 shows the step flow of the management device 20. Because the optical communication network that performs the optical path re-arrangement was described with reference to FIGS. 1 and 2, a description thereof is omitted here. A description that overlaps with the optical path re-arrangement of the first embodiment that was described with reference to FIGS. 3 and 4 is also omitted.

The management device 20 comprises evaluation result counting means 94 and a plurality of two-stage shift evaluating means 100a to 100c. Further, the plurality of two-stage shift evaluating means 100a to 100c need not necessarily be constituted within the management device 20 and may instead be constituted separately outside the management device 20.

S10 and S20 are the same as in the first embodiment and are therefore not described here.

In the first-order shift optical path selection step of S30, first-order shift optical path selecting means 104a to 104c of the two-stage shift evaluating means 100a to 100c select a plurality of first-order shift optical paths when changing the optical path arrangement by means of a two-stage shift.

In the two-stage packet loss evaluation step of S40, evaluating means 102a to 102c of the two-stage shift evaluating means 100a to 100c calculate the packet loss amount when shifting the optical path arrangement by means of a two-stage shift on the basis of the first-order shift optical path and second-order shift optical path selected in S30 and traffic information that is read from the storage section 66 or RAM 74. In the second embodiment, the first-order shift optical path selection step of S30 and the two-stage packet loss evaluation step of S40 are implemented at the same time the same number of times as there are two-stage shift evaluating means 10a to 100c that the management device 20 comprises.

In S45, evaluation result counting means 94 readably record, in the RAM 74, the smallest of the packet loss amounts obtained in the two-stage packet loss evaluation steps of S40 implemented at the same time as the evaluation result, that is, as the second evaluation value.

S50 and the subsequent steps are the same as in the first embodiment and will not be described here.

With the optical path re-arrangement method of the second embodiment, a plurality of two-stage shift evaluation steps are performed at the same time and the best of the results is made the evaluation result, that is, the second evaluation value, and, therefore, an optimum resolution can be found in a short time in addition to the effects obtained in the first embodiment.

Third Embodiment

Figure 9:
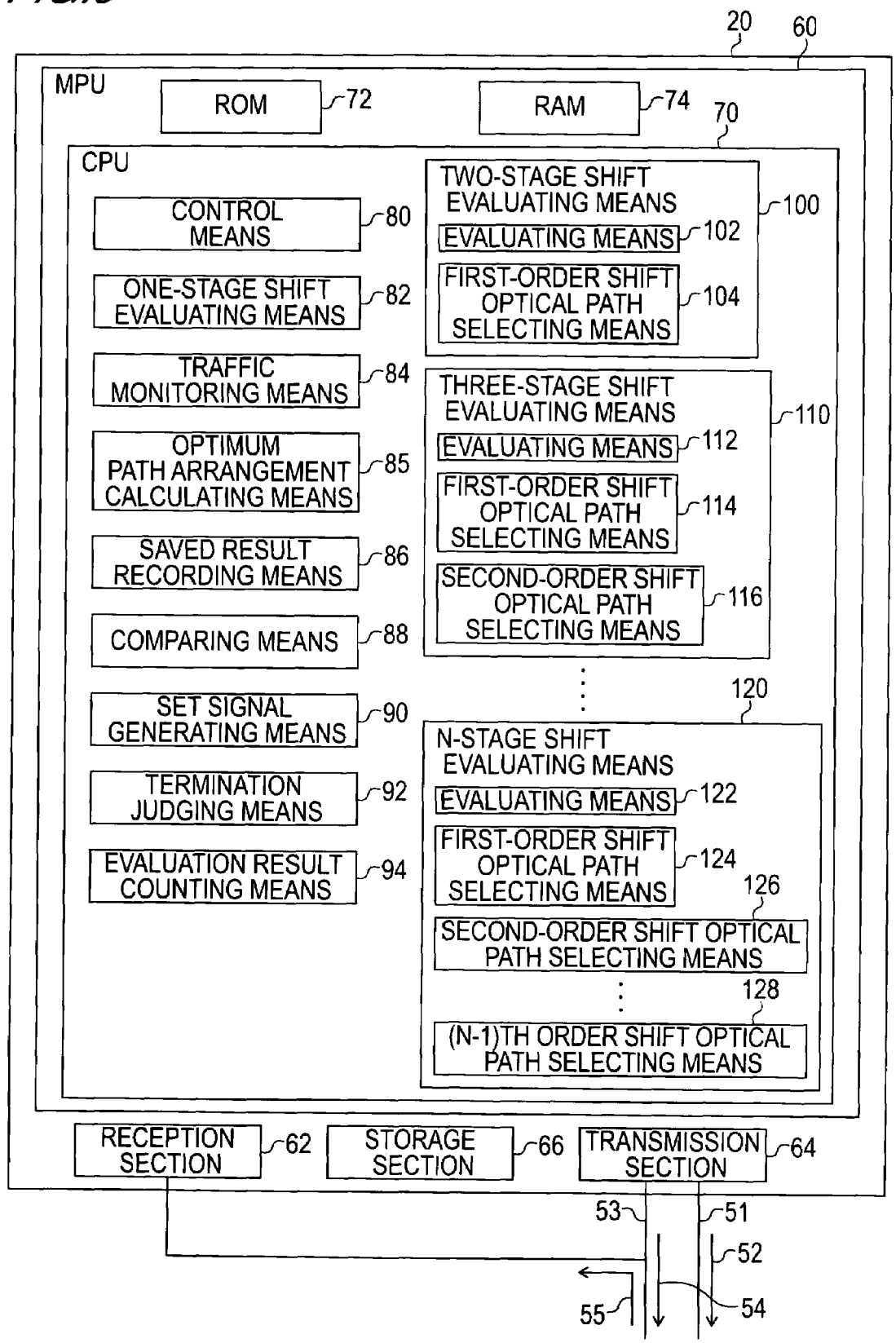
FIG. 9 is a block diagram serving to illustrate a management device of a third embodiment.
Figure 10:
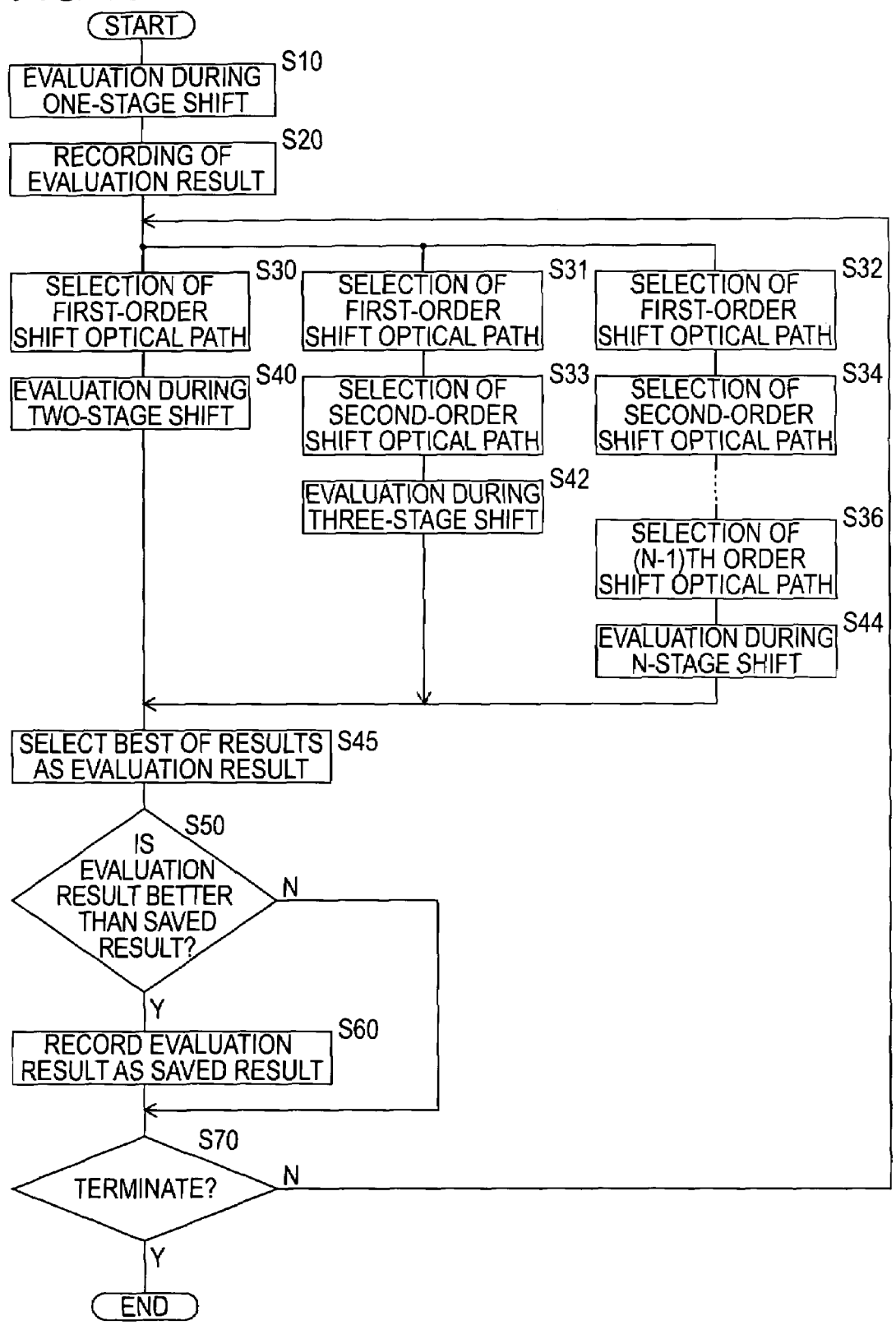
FIG. 10 shows the step flow of the management device of the third embodiment.

The optical path shift method of the third embodiment will now be described with reference to FIGS. 9 and 10. FIG. 9 is a block diagram serving to illustrate the constitution of the management device 20 and FIG. 10 shows the step flow of the management device 20. Because the optical communication network that performs the optical path re-arrangement was described with reference to FIGS. 1 and 2, a description thereof is omitted here. A description that overlaps with the optical path re-arrangement of the first embodiment that was described with reference to FIGS. 3 and 4 is also omitted.

The management device 20 comprises evaluation result counting means 94 and two- to N-stage shift evaluating means (N is an integer of two or more) 100, 110, and 120. First-order shift path selecting means 114 that the three-stage shift evaluating means 110 comprise select the first-order shift optical paths when changing the optical path arrangement by means of a three-stage shift. Here, one third of the canceled paths are selected as the first-order shift optical paths. Second-order shift path selecting means 116 that the three-stage shift evaluating means 110 comprise select half the number of canceled paths that have not been selected as first-order shift optical paths as second-order shift path selecting means. The remaining half of the optical paths is third-order shift optical paths. Further, the first-order shift optical paths and second-order shift optical paths are randomly selected from the canceled paths. Likewise, the N-stage shift evaluating means 120 comprise first- to (N−1) th-order shift optical path selecting means 124, 126, and 128 and classify the canceled paths as first- to Nth-order shift optical paths.

S10 and S20 are the same as in the first embodiment and are therefore not described here.

In the first-order shift optical path selection step of S30, first-order shift optical path selecting means 104 of the two-stage shift evaluating means 100 select a plurality of first-order shift optical paths when changing the optical path arrangement by means of a two-stage shift.

In the two-stage packet loss evaluation step of S40, evaluating means 102 of the two-stage shift evaluating means 100 calculate the packet loss amount when shifting the optical path arrangement by means of a two-stage shift on the basis of the first-order shift optical path and second-order shift optical path selected in S30 and traffic information that is read from the storage section 66 or RAM 74.

At the same time as the serial step of S30 and S40, in the first-order shift optical path selection step of S31, the first-order shift path selecting means 114 of the three-stage shift evaluating means 110 divides the canceled paths into three groups and select the optical paths that belong to one group as first-order shift optical paths. Here, the canceled paths are divided into three equal groups. Thereafter, in S33, the second-order shift path selecting means 116 that the three-stage shift evaluating means 110 comprises selects one of the two groups that have not been selected as the first-order shift optical paths from among the three groups of the canceled paths as second-order shift paths. The optical paths that belong to the groups that have not been selected as the first-order shift optical paths and second-order shift optical paths are the third-order shift optical paths. Further, the first-order shift optical paths and second-order shift optical paths are randomly selected from the canceled paths.

In the three-stage packet loss evaluation step of S42, the evaluating means 112 that the three-stage shift evaluating means 110 comprise calculate the packet loss amount when shifting the optical path arrangement by means of a three-stage shift on the basis of the first- to third-order shift optical paths selected in S31 and S33.

At the same time as the serial step of S30 and S40, the N-stage shift means 120 also classify the canceled paths as first- to Nth-order shift optical paths in the first- to (N−1)th-order shift optical path selection steps of S32, S34, and S36.

In the N-stage packet loss evaluation step of S44, the packet loss amount when shifting the optical path arrangement by means of an N-stage shift is calculated on the basis of the first- to Nth-order shift optical paths classified in S32, S34, and S36.

In the multiple-stage shift evaluation step of S45, the evaluation result counting means 94 readably record, in the RAM 74, the smallest of the packet loss amounts obtained in the two- to N-stage packet loss evaluation steps of S40, S42, and S44 implemented at the same time as the second evaluation value, which is the evaluation result.

S50 and the subsequent steps are the same as in the first embodiment and will not be described here.

With the optical path re-arrangement method of the third embodiment, a plurality of two- to N-stage shift evaluation steps are performed at the same time and the best of the results is made the evaluation result, and therefore, a shift procedure with a smaller packet loss amount can be found by increasing the number of stages in the shift in addition to the effects obtained in the first embodiment.

Fourth Embodiment

Figure 11:
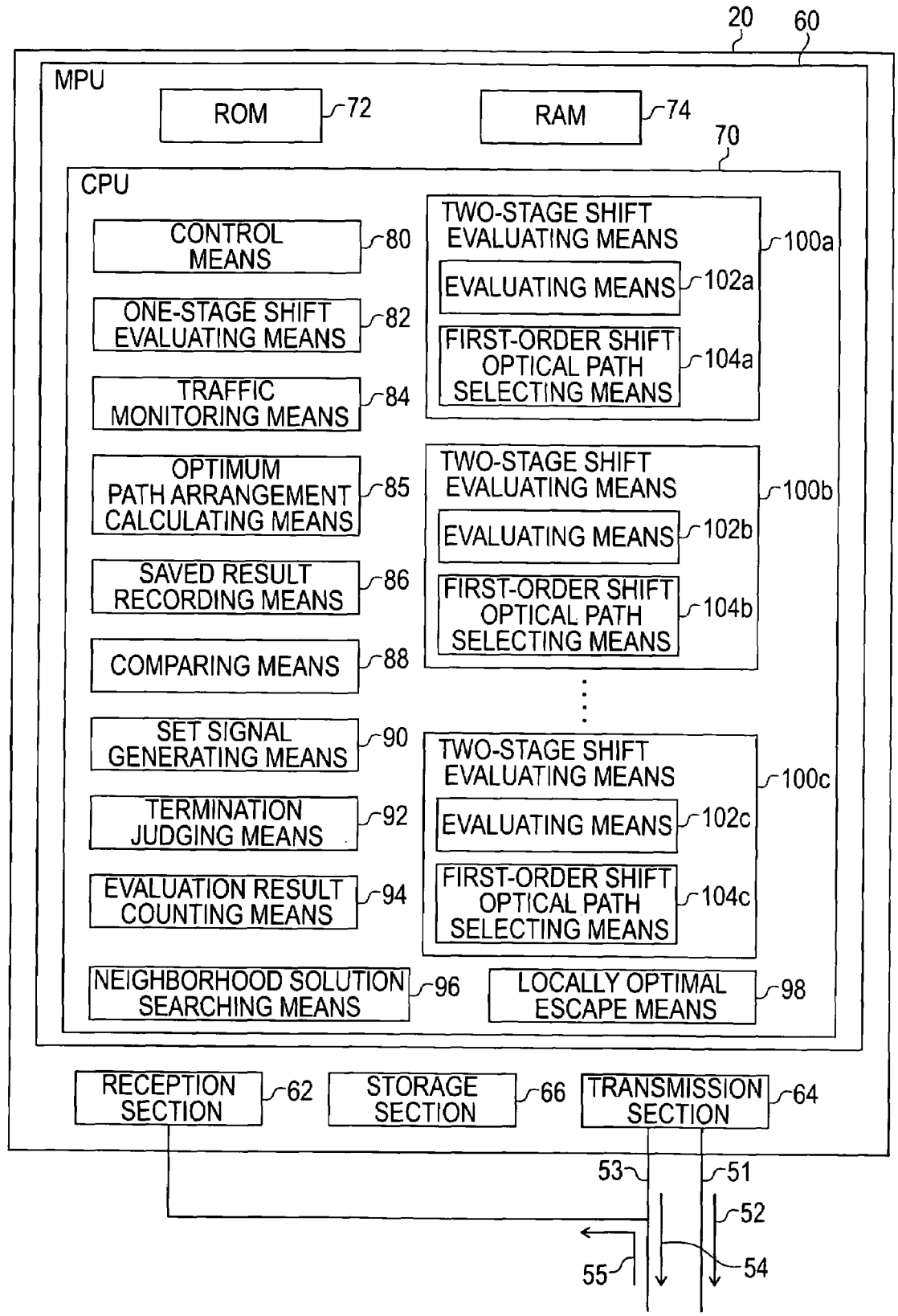
FIG. 11 is a block diagram serving to illustrate a management device of a fourth embodiment.
Figure 12:
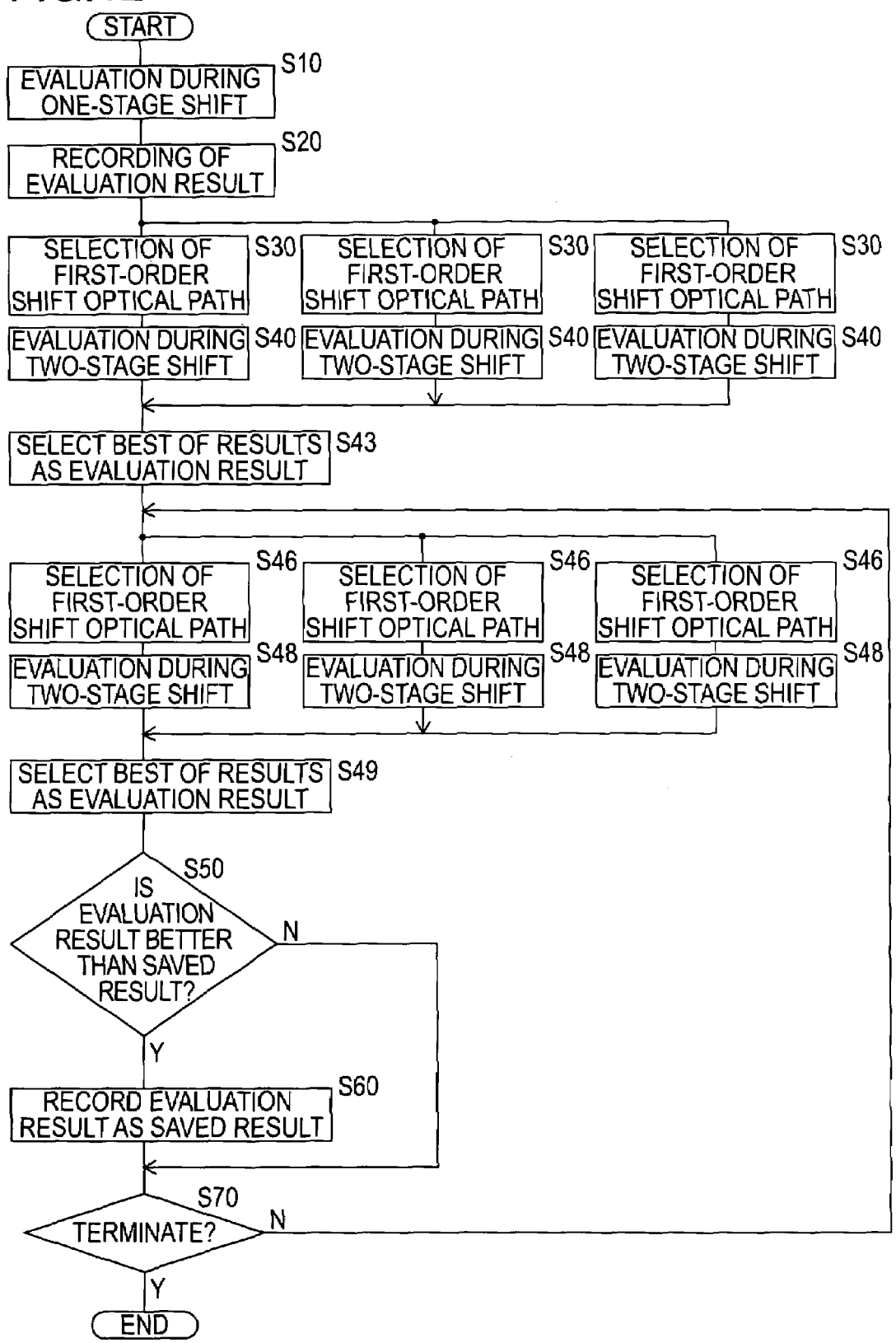
FIG. 12 shows the step flow of the management device of the fourth embodiment.

The optical path re-arrangement method of the fourth embodiment will now be described with reference to FIGS. 11 and 12. FIG. 11 is a block diagram serving to illustrate the constitution of the management device 20 and FIG. 12 shows the step flow of the management device 20. Because the optical communication network that performs the optical path re-arrangement was described with reference to FIGS. 1 and 2, a description thereof is omitted here. A description that overlaps with the re-arrangement method of the second embodiment that was described with reference to FIGS. 7 and 8 is also omitted.

The management device 20 comprises neighborhood solution searching means 96 and locally optimal escape means 98.

The steps from S10 to S40 are the same steps as those in the second embodiment and therefore not described here.

In S43, the evaluation result counting means 94 readably record, in the RAM 74, the evaluation result that is the smallest among the packet loss amounts obtained in the two-stage packet loss evaluation steps of S40 that are implemented at the same time, that is, the second evaluation value, and the first-order and second-order shift optical paths.

In S46, the neighborhood solution searching means 96 preferably search for a plurality of neighborhood solutions equal to or more than the number of two-stage shift evaluation means that the CPU 70 comprises from the evaluation result read from RAM 74 and readably records the results in the RAM 74 or storage section 66. Here, the neighborhood solution means substituting less than half the changed optical paths among the first-order shift optical paths providing the second evaluation value (known simply as the 'optimum first-order shift optical paths' hereinbelow) with the second-order shift optical paths (known simply as the 'optimum second-order shift optical paths' hereinbelow) that provide the second evaluation value. The neighborhood solution may preferably be a neighborhood solution that involves substituting one optical path selected randomly from the optimum first-order shift optical paths with one optical path that is selected randomly from the optimum second-order shift optical paths.

The first-order shift optical path selecting means 104a to 104c of the two-stage shift evaluating means 100a to 100c perform a first-order shift optical path selection step that selects the first-order shift optical path that changes the optical path arrangement by means of a two-stage shift. Further, this first-order shift optical path is randomly selected from the neighborhood solutions recorded in the RAM 74 or storage section 66.

In S48, a two-stage packet loss evaluation step that performs an evaluation by calculating the packet loss amount when changing the optical path arrangement by means of a two-stage shift on the basis of the first-order shift optical paths and second-order shift optical paths selected in S46 is performed. Further, in the fourth embodiment, the first-order shift optical path selection step of S46 and the two-stage packet loss evaluation step of S48 are implemented at the same time a number of times that is the same as the number of two-stage shift evaluation means.

In S49, the evaluation result counting means 94 readably record, in the RAM 74, the evaluation result that is the smallest among the packet loss amounts obtained in the two-stage packet loss evaluation steps of S40 that are implemented at the same time, that is, the second evaluation value, and the first-order and second-order shift optical paths.

In S50, the comparing means 88 perform an evaluation by reading the packet loss amount indicated by the second evaluation value recorded in the RAM 74 and the packet loss amount indicated by the first evaluation value that is recorded in the RAM 74 or storage section 66 respectively and comparing the two packet loss amounts. When, as a result of the comparison, the packet loss amount indicated by the second evaluation value is smaller than the packet loss amount indicated by the first evaluation value, it is judged that the evaluation result is superior to the saved result. When it is judged that the evaluation result is superior to the saved result, in S60, the evaluation result is substituted with the previous saved result, that is, the first evaluation value in response to the judgment and then newly recorded in the RAM 74 or storage section 66 as the saved result.

In S70, in response to the termination of the rewriting of the saved result, the termination judging means 92 judge whether the processing termination condition is satisfied. The processing termination condition can be optionally preferably set as the time for performing the processing of the management device 20, or the number of times that the round step of the two-stage shift evaluation step S2 and the comparison step S3 are repeatedly implemented, for example, and so forth. In each round of processing, a comparison is made with the processing termination condition read from the storage device and the processing termination condition is readably recorded in the ROM 72 beforehand. The steps S46 to S60 are repeated until the processing termination condition is satisfied.

Further, in the first-order shift optical path selection step of S46, the first-order shift optical path selecting means 104a to 104c are able to select a locally optimal escape resolution in addition to selecting a neighborhood solution from the first-order optical paths. Here, the locally optimal escape resolution involves the locally optimal escape means 98 substituting half or more of the first-order shift optical paths that provide the second evaluation value, which are read from the RAM 74, with the second-order shift optical paths and then readably recording the second-order shift optical paths in the RAM 74 or storage section 66 or the like. Further, the first-order shift optical paths that provide the second evaluation value may all be substituted with second-order shift optical paths.

One locally optimal escape resolution may be selected each time S46 to S60 are repeated or one locally optimal escape resolution may be selected after the processing of S46 to S60 has been repeated a plurality of times.

The optical path re-arrangement method of the fourth embodiment makes it possible to shorten the search time of the optimum resolution by using the neighborhood solution of the paths rendered by obtaining the second evaluation value when the two-stage shift evaluation step is performed. Further, the optimum resolution search can be performed without locally optimal trapping by performing the two-stage shift evaluation step by using a locally optimal escape resolution that is different from the path rendered by obtaining the second evaluation value.

Furthermore, each of the embodiments is constituted with the objective of minimizing the total packet loss amount when the path arrangement is changed. However, the use of an evaluation index other than the expected packet loss amount as the evaluation index for selecting the change method when the path arrangement is changed may also be considered.

The constitution may be one that employs the estimated worst value for the packet transfer delay time during a shift, for example, as another evaluation index, and which selects the change method that minimizes the worst value. Further, the constitution may be one that employs the traffic amount of the router with the highest load during a shift and which selects the change method that minimizes this load. In such a case, the evaluation value when calculated in each stage may be changed to an evaluation value that corresponds with the respective evaluation index without there being a need to change the processing procedure described in each of the embodiments above.

What is claimed is:

1. An optical path re-arrangement method for re-arranging optical paths in an optical communication network comprising a plurality of routers, a plurality of optical switches, optical fiber connecting the routers and optical switches or connecting the optical switches, and a management device, comprising the steps of:

obtaining a first evaluation value by evaluating a packet loss amount when changing the optical path arrangement by means of a one-stage shift;

recording said first evaluation value in a storage device;

selecting randomly, as a first-order shift optical path one optical path group produced by dividing an optical group that is to be changed into two when changing the optical path arrangement by means of a two-stage shift of a first order shift and a second-order shift and then making the other optical path group a second shift optical path;

obtaining a second evaluation value by evaluating a packet loss amount when changing the optical path arrangement by means of the two-stage shift; and comparing said second evaluation value with said first evaluation value and, when said second evaluation value is smaller than said first evaluation value, substituting said first evaluation value with said second evaluation value and then recording said first evaluation value and said first and second-order shift optical paths in the storage device, wherein a processing termination condition that is prerecorded in the storage device is read, the step for selecting, the step for obtaining a second evaluation value and the step for comparing are repeated until said processing termination condition is satisfied, and said processing termination condition is set as the time for performing the processing of said management device or the number of the times that the step for comparing said second evaluation value with said first evaluation value is repeatedly implemented.

2. An optical path re-arrangement method of the optical communication network according to claim 1, wherein, in the step for selecting, a plurality of sets of first-order shift optical paths and second-order shift optical paths are selected at the same time; and in the step for obtaining a second evaluation value, the packet loss amounts relating to each of the selected a plurality of sets of first-order shift optical paths and second shift optical paths are obtained at the same time and the smallest packet loss amount among said plural sets of packet loss amounts thus obtained is made the second evaluation value.

3. An optical path re-arrangement method for re-arranging optical paths in an optical communication network comprising a plurality of routers, a plurality of optical switches, optical fiber connecting the routers and optical switches or connecting the optical switches, and a management device, comprising the steps of:

obtaining a first evaluation value by evaluating a packet loss amount when changing the optical path arrangement by means of a one-stage shift;

recording said first evaluation value in a storage device;

selecting randomly first- to (N−1)th-order shift optical paths respectively by dividing an optical path group that is to be changed into N equal parts when changing the optical path arrangement by means of an N-stage shift of first- to Nth-order shifts (where N is an integer of two or more) and then making the remaining optical path the Nth-order shift optical path;

obtaining the packet loss amount when changing the optical path arrangement by means of the N-stage shift;

performing the step for obtaining the packet loss amount by means of second to Nth stage shift respectively making the smallest packet loss among the plurality of packet loss amounts thus obtained the second evaluation value; and comparing said second evaluation value with said first evaluation value and, when said second evaluation value is smaller than said first evaluation value, substituting the first evaluation value with said second evaluation value and then recording said first evaluation value and said first-order to Nth-order shift optical paths in said storage device, wherein a processing termination condition that is pre-recorded in the storage device is read, the steps for obtaining the packet loss amount by means of a second to Nth stage shift, the step for obtaining the second evaluation, and the step for comparing are repeated until said processing termination condition is satisfied, said processing termination condition is set as the time for performing the processing of said management device or the number of the times that the step for comparing said second evaluation value with said first evaluation value is repeatedly implemented.

4. An optical path re-arrangement method for re-arranging optical paths in an optical communication network comprising a plurality of routers, a plurality of optical switches, optical fiber connecting the routers and optical switches or connecting the optical switches, and a management device, comprising the steps of:

obtaining a first evaluation value by evaluating a packet loss amount when changing the optical path arrangement by means of a one-stage shift;

recording said first evaluation value in a storage device;

selecting a plurality of sets of first-order shift optical paths and second-order shift optical paths at the same time when changing the optical path arrangement by means of a two-stage shift of a first-order shift and a second-order shift, wherein one optical path group produced by dividing an optical path group that is to be changed into two are selected as said first-order shift optical paths and then the other optical path group is selected as said second shift optical path;

obtaining packet loss amounts relating to each of the selected plural sets of first order shift optical paths and second shift optical paths at the same time;

making the smallest packet loss amount among said plural sets of packet loss amounts thus obtained as the second evaluation value;

selecting a neighborhood solution and the locally optimal escape resolution that is different from said neighborhood solution as a plurality of sets of first-order shift optical paths and second-order shift optical paths, wherein said neighborhood solution is a solution that the one optical path selected randomly from the first-order shift optical path rendered by obtaining said second evaluation value is substituted with one optical path selected randomly from the second-order shift optical path rendered by obtaining said second evaluation value;

implementing the step for obtaining packet loss amounts and making the smallest packet loss among a plurality of sets of packet loss amounts;

comparing said second evaluation value with said first evaluation value and when said second evaluation value is smaller than said first evaluation value, substituting said first evaluation value with said second evaluation value and then recording said first evaluation value and said first and second-order shift optical paths in the storage device, wherein a processing termination condition that is pre-recorded in the storage device is read, the step for selecting, the step for obtaining a second evaluation value and the step for comparing are repeated until said processing termination condition is satisfied and said processing termination condition is set as the time for performing the processing of said management device or the number of the times that the step for comparing said second evaluation value with said first evaluation value is repeatedly implemented.

5. A management device used for re-arranging optical paths in an optical communication network comprising a plurality of routers, a plurality of optical switches, optical fiber connecting the routers and optical switches or connecting the optical switches, and a management device, comprising:

one-stage shift evaluating means for obtaining a first evaluation value by evaluating a packet loss amount when changing the optical path arrangement by means of a one-stage shift;

saved result recording means for recording said first evaluation value in a storage device;

first-order shift optical path selecting means for selecting randomly as a first-order shift optical path one optical path group by dividing an optical path group that is to be changed into two when changing the optical path arrangement by means of a two-stage shift of a first-order shift and a second-order shift and for making the other optical path group a second shift optical path;

evaluating means for obtaining a second evaluation value by evaluating a packet loss amount when changing the optical path arrangement by means of a two-stage shift;

comparing means for comparing said second evaluation value with said first evaluation value and, when said second evaluation value is smaller than said first evaluation value, substituting said first evaluation value with said second evaluation value and then recording said first evaluation value and said first and second-order shift optical paths in the storage device; and termination judging means for reading a processing termination condition that is pre-recorded in the storage device and for judging whether said processing termination condition is satisfied, wherein said processing termination condition is set as the time for performing the processing of said management device or the number of the times that the step for comparing said second evaluation value with said first evaluation value is repeatedly implemented.

6. A management device according to claim 5, wherein said management device comprises, a plurality of sets of said first-order shift optical path selecting means and said evaluating means; and evaluation result counting means for obtaining the smallest packet loss amount among said plural sets of packet loss amounts obtained at said plural one-stage shift evaluating means as the second evaluation value.

7. A management device used for re-arranging optical paths in an optical communication network comprising a plurality of routers, a plurality of optical switches, optical fiber connecting the routers and optical switches or connecting the optical switches, and a management device, comprising:

one-stage shift evaluating means for obtaining a first evaluation value by evaluating a packet loss amount when changing the optical path arrangement by means of a one-stage shift;

saved result recording means for recording said first evaluation value in a storage device;

two- to N-stage shift evaluating means (N is an integer of two or more) comprising of a first- to (N−1)th-order shift optical path selecting means which select randomly first- to (N−1)th-order shift optical paths respectively by dividing an optical path group that is to be changed into N equal parts when changing the optical path arrangement by means of an N-stage shift of first- to Nth-order shifts and which make the remaining optical path the Nth-order shift optical path and evaluating means for obtaining a second evaluation value by evaluating a packet loss amount when changing the optical path arrangement by means of an N-stage shift;

evaluation result counting means for obtaining the smallest packet loss amount among said plural sets of packet loss amounts obtained in said two- to N-stage shift evaluating means;

comprising means for comparing said second evaluation value with said first evaluation value and, when said second evaluation value is smaller than said first evaluation value, substituting said first evaluation value with said second evaluation value and then recording said first evaluation value and said first and second-order shift optical paths in the storage device; and termination judging means for reading a processing termination condition that is pre-recorded in the storage device and for judging whether said processing termination condition is satisfied, wherein said processing termination condition is set as the time for performing the processing of said management device of the number of the times that the step for comparing said second evaluation value with said first evaluation value is repeatedly implemented.

8. A management device used for re-arranging optical paths in an optical communication network comprising a plurality of routers, a plurality of optical switches, optical fiber connecting the routers and optical switches or connecting the optical switches, and a management device, comprising:

one-stage shift evaluating means for obtaining a first evaluation value by evaluating a packet loss amount when changing the optical path arrangement by means of a one-stage shift;

saved result recording means for recording said first evaluation value in a storage device;

plural first-order shift optical path selecting means for selecting as a first-order shift optical path one optical path group produced by dividing an optical path group that is to be changed into two when changing the optical path arrangement by means of a two-stage shift of a first-order shift and a second-order shift and then making the other optical path group a second shift optical path;

plural evaluating means for obtaining a second evaluation value by evaluating a packet loss amount when changing the optical path arrangement by means of a two-stage shift;

evaluation result counting means for obtaining the smallest packet loss amount among said plural sets of packet loss amounts obtained at said plural one-stage shift evaluating means as the second evaluation value;

neighborhood solution searching means for searching a neighborhood solution wherein said neighborhood solution is a solution that the one optical path selected randomly from the first-order shift optical path rendered by obtaining said second evaluation value is substituted with the one optical path selected randomly from the second-order shift optical path rendered by obtaining said second evaluation value;

locally optimal escape means for obtaining a locally optimal escape resolution;

comparing means for comparing said second evaluation value with said first evaluation value and, when said second evaluation value is smaller than said first evaluation value, substituting said first evaluation value with said second evaluation value and then recording said first evaluation value and said first and second-order shift optical paths in the storage device; and termination judging means for reading a processing termination condition that is pre-recorded in the storage device and for judging whether said processing termination condition is satisfied, wherein said first-order shift optical path selecting means is able to select said neighborhood solution or said locally optimal escape resolution as the first-order shift optical path and processing termination condition is set as the time for performing the processing of said management device or the number of the times that the step for comparing said second evaluation value with said first evaluation value is repeatedly implemented.

\* \* \* \* \*